United States Patent Office 3,450,765
Patented June 17, 1969

3,450,765
AMMONOLYSIS OF HALIDES
Walter E. Steinmetz, Shreveport, La., assignor to El Paso Products Company, Odessa, Tex., a corporation of Texas
No Drawing. Continuation-in-part of application Ser. No. 484,801, Sept. 3, 1965. This application July 5, 1966, Ser. No. 562,456
Int. Cl. C07c 85/04
U.S. Cl. 260—585                    5 Claims

ABSTRACT OF THE DISCLOSURE

Process for producing alkylenediamines, useful as an intermediate for producing nylon, comprising reacting an alkylene dihalide with about 50 to 300 moles of anhydrous liquid ammonia per mole of 1,6-dihalohexane at a temperature of about 0° to 100° C. and a pressure of about 100 to 1000 p.s.i.g. and recovering the products produced.

Cross reference to related applications

This application is a continuation-in-part of application Ser. No. 484,801, filed Sept. 3, 1965.

This invention relates to ammonolysis reactions and more particularly to the production of polyamines by the direct ammonolysis of alkylene dihalides.

As is well known, the nylon industry has assumed a role of vast commercial importance due in large part to the unique characteristics of polyamide-type resins which render them highly valuable for use in a wide variety of commercial applications. The ever-increasing demand for nylon-type products has correspondingly initiated widespread commercial demand for the provision of feasible processes for the production of nylon intermediates and especially alkylenediamines. These latter materials are of course, basic to the preparation of the several grades of nylon, and, accordingly, a large measure of industrial research effort has been directed to improved processes for their synthesis economically.

It is well known, that alkyl halides can be converted directly to their corresponding amine derivatives by treatment with ammonia. However, the methods heretofore provided for effecting such conversions have required the use of elevated temperatures on the order of 125° C. and often in excess of 200° C. These elevated temperature conditions have been found to result in commercially feasible reaction rates, product yield, etc. However, the products derived from these prior processes have generally been composed of a mixture of various mono- and polyamines and high molecular weight materials which are difficultly separable. Therefore, it has been necessary to resort to further treatments, e.g., fractional distillation, extraction and the like, in order to eventually separate and isolate the desired product. Moreover, the use of elevated temperatures frequently give rise to excessive amounts of undesirable by-products.

It is accordingly, one object of the present invention to provide a new and improved process for the direct ammonolysis of aliphatic dihalides wherein the diamine is selectively formed in a predominant amount under relatively mild conditions.

A further object and advantage of the present invention resides in the provision of a new and improved ammonolysis process for the selective formation of primary diamines from aliphatic dihalides wherein the formation of undesirable by-products is substantially minimized.

A primary advantage of the present invention is that the direct ammonolysis of aliphatic dihalides to selectively form the corresponding diamines in a predominant amount is carried out under mild reaction conditions and without the use of expensive high pressure equipment such that an efficient and reliable economically feasible process for diamine formation on a large scale is presented.

Briefly stated, these and other objects and advantages of the present invention are realized by the provision of a new and improved process for the direct ammonolysis of aliphatic dihalides to form the corresponding diamines which comprises reacting the aliphatic dihalide with a large excess of anhydrous liquid ammonia at a temperature of about 0° to 100° C. and a pressure of about 100 to 1000 p.s.i.g., removing the excess ammonia from the reaction mixture, treating with a base and separating the freed diamine product.

It has now been discovered that the corresponding diamino derivatives of aliphatic dihalides may be produced by the direct ammonolysis of the dihalides without the formation of the undesirable secondary, tertiary and cyclic amine derivatives which are formed in excessive amounts in all known prior art processes. The process of this invention has been found to result in substantially one hundred percent conversions of the dihalide to diamines. The reaction is carried out without the necessity of unwieldy catalytic systems and costly high pressure equipment and therefore offers a commercially attractive method for aliphatic diamine formation.

Contrary to the prior processes described above, the amine-forming reaction contemplated for use herein is carried out under relatively mild temperature conditions employing specific proportions of the ammonia reactant. The reaction is also carried out under slight conditions of pressure as contrasted with high pressure synthesis.

The ammonolysis reaction is performed by use of an excess of anhydrous ammonia, the latter being employed in the liquid phase. The ammonia reactant is employed in a large excess corresponding to a molar ratio of about 50 to 350 moles per mole of dihalide, a ratio which has been found to result in selective production of the desired diamino product. This result is somewhat surprising as it would ordinarily be expected that the ammonia and dihalo compound would react to form high molecular weight derivatives of the resinous variety. However, when operating under the conditions hereinafter specified, it has been found that any tendency for production of such products is substantially eliminated.

The ammonolysis method of this invention is considered applicable to aliphatic dihalide starting materials in general, and to those of the following formula in particular:

wherein R is a divalent aliphatic hydrocarbon radical and X is a halogen atom such as chlorine, bromine, iodine or fluorine.

A special class of aliphatic dihalides to which the process of the invention is applicable are the alkylene dihalides of the following formula:

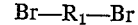

wherein $R_1$ is a divalent alkylene hydrocarbon of 1 to 12 carbon atoms. Specific compounds of the preferred class include such dihalides as ethylene dibromide, propylene dibromide, butylene dibromide, etc. For purposes of illustration the amination reaction will be described with respect to ammonolysis of 1,8-dibromooctane to produce the corresponding octamethylenediamine.

An advantage of the instant reaction is that an acidic material, such as an ammonium halide is not necessary to attain the objects of the invention. This is in contradistinction to prior processes where the presence of a material, such as ammonium chloride, was though necessary to prevent excessive by-product formation.

The amination process of this invention is carried out under mild conditions of temperature as specified hereinabove. The reaction temperature lies in the range of about 0° to 100° C., preferably about 10° to 50° C. An especially preferred reaction temperature is about 30° C.

At these temperatures, it has been found that the pressure of the reaction should be maintained at about 100 to 1000 p.s.i.g. depending on the temperature employed. A preferred pressure operation is about 100 to 500 p.s.i.g. with an especially preferred reaction pressure of about 200 p.s.i.g. Hence, another advantage of the process is realized by obviating the need for expensive high pressure operating equipment such as that required by pressure operations of 4000 p.s.i.g. and higher.

The reaction ordinarily requires from about ten minutes to about five hours to go to completion depending on the starting materials employed. However, the reaction is preferably conducted by mixing the reactants within a relatively short period, such as fifteen to twenty-five minutes and thereafter agitating until the reaction goes to completion.

The reaction is conducted by charging the anhydrous liquid ammonia to a stirred reactor and adding the dihalogenated compound thereto over a short period and thereafter agitating. After completion of the reaction, and removal of the excess ammonia, the resulting aminated mixture is neutralized with a base to free the amine from its hydrogen halide salt. Thereafter, the hydrocarbon component of the effluent is separated and sent to a conventional distillation train for purification of the diamine. The excess ammonia reactant is recycled in a continuous process and the metal halide may be recovered for processing.

The metal halide recovered may be suitably processed to recover the bromine as hydrogen bromide.

The following example illustrates the application of the novel amination reaction of this invention as applied to the amination of 1,8-dibromooctane to produce octamethylenediamine. However, the example is to be considered solely as illustrative of the invention and not limiting thereon.

EXAMPLE

The reactor employed in this example comprised a 1-liter stainless steel autoclave with agitation provided by a Magne-dash stirrer.

19.6 gram moles of anhydrous liquid ammonia were charged to the autoclave and the stirring commenced. Then, 0.060 gram mole of 1,8-dibromooctane were added over a period of about 25 minutes. Thereafter, the reactor was stirred for four hours at a temperature of about 30° C. and a pressure of about 200 p.s.i.g. The starting material amounts added represent a ratio of 326 moles of ammonia to 1 mole of 1,8-dibromooctane.

At the conclusion of the reaction, the autoclave was first vented to remove excess ammonia after which the contents were dissolved in 100 ml. of methanol. The residue was then treated with 16 grams of $NaOCH_3$ dissolved in methanol and the solution filtered to remove precipitated sodium bromide. This mixture was sampled and analyzed by means of gas chromatography and the results thereof are appended in table below:

TABLE

| Product | 326 moles $NH_3$/mole 1,8-dibromooctane | |
|---|---|---|
| | Wt. percent | Percent efficiency |
| Octamethyleneimine | 14.10 | 15.7 |
| Octamethylenediamine | 79.80 | 77.6 |
| Other dimers | 2.42 | 2.69 |
| Cyclic dimers | 1.81 | 2.04 |
| Linear dimers | 1.87 | 2.04 |

Although the present invention has been specifically set forth in connection with the preparation of octamethylenediamine, it will be understood that the process described herein is generally applicable to the general production of alkane diamines from starting dihalogenated alkylenes of the type defined herein. For example, the present invention is likewise eminently suitable for the preparation of mixtures of alkylene diamines which, of course, could be readily achieved by merely employing two or more different dihalogenated hydrocarbons as starting materials.

What is claimed is:

1. A process for the production of alkylene diamines which comprises reacting an alkylene dehalide of the formula:

$$X-R-X$$

wherein R is alkylene of 1 to 12 carbon atoms and X is a halogen atom, with about 50 to 300 moles of anhydrous liquid ammonia per mole of alkylene dihalide at a temperature of about 10° to 50° C. and a pressure of about 100 to 1000 p.s.i.g., treating the resultant mixture with a base to free the diamine from its hydrohalide salt and recovering the alkylene diamine.

2. A process according to claim 1 wherein the reaction is conducted at a temperature of about 30° C.

3. A process according to claim 2 wherein the reaction is conducted at a pressure of about 200 p.s.i.g.

4. A process according to claim 3 wherein the halide is bromine.

5. A process according to claim 1 wherein the base is $NaOCH_3$.

References Cited

UNITED STATES PATENTS 2,034,427 3/1936 Campbell _____ 260—585 X
2,268,620 1/1942 Rigby _____ 260—585 X CHARLES B. PARKER, *Primary Examiner.*

R. L. RAYMOND, *Assistant Examiner.*